(12) United States Patent
Ananthaswamy

(10) Patent No.: US 7,746,186 B2
(45) Date of Patent: Jun. 29, 2010

(54) WIDEBAND QUADRATURE IMBALANCE COMPENSATION SYSTEM AND METHOD

(75) Inventor: Ganesh Ananthaswamy, North Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 199 days.

(21) Appl. No.: 12/011,672

(22) Filed: Jan. 29, 2008

(65) Prior Publication Data

US 2009/0189707 A1 Jul. 30, 2009

(51) Int. Cl.
*H04L 27/20* (2006.01)
(52) U.S. Cl. .................. 332/103; 329/304; 329/336; 329/345; 329/347; 375/308; 375/329
(58) Field of Classification Search .............. 329/304, 329/336, 345, 347; 332/103; 375/308, 329
See application file for complete search history.

(56) References Cited

U.S. PATENT DOCUMENTS

| 4,054,838 | A * | 10/1977 | Tretter | 375/376 |
| 2003/0007583 | A1 * | 1/2003 | Hilton et al. | 375/350 |
| 2003/0141938 | A1 * | 7/2003 | Poklemba et al. | 332/103 |
| 2005/0243953 | A1 * | 11/2005 | Beyer et al. | 375/346 |
| 2007/0211837 | A1 * | 9/2007 | Zipper | 375/350 |
| 2008/0143562 | A1 * | 6/2008 | Huang et al. | 341/118 |

OTHER PUBLICATIONS

J Cavers "New Method for Adaptation of Quadrature Modulators and Demodulators in Amplifier Linearization Circuits", IEEE Transactions on Vehicular Technology, vol. 46, pp. 707-716, No. 3, Aug. 1997.

* cited by examiner

*Primary Examiner*—Arnold Kinkead
*Assistant Examiner*—Richard Tan
(74) *Attorney, Agent, or Firm*—Kenyon & Kenyon LLP

(57) ABSTRACT

Compensating for wideband quadrature imbalance error by introducing inverse complex inputs to phase quadrature estimator filters to generate estimated quadrature distortion; summing estimator quadrature distortion with a delayed version of the actual complex input to obtain estimated quadrature output; comparing the output with the true output to obtain residual quadrature imbalance error; applying a least mean square to the inverse input and imbalance residual error to obtain an updated estimate of filter coefficients; updating the filter coefficients of the phase quadrature estimator; and updating the filter coefficients of a phase quadrature compensator with the filter coefficients of the phase quadrature estimator to obtain a quadrature output pre-compensated for quadrature imbalance error.

12 Claims, 10 Drawing Sheets

WIDEBAND QUADRATURE IMBALANCE COMPENSATION SYSTEM AND METHOD

FIELD OF THE INVENTION

This invention relates to a wideband quadrature imbalance compensation system and method and more particularly to such a compensation system and method which may be adapted for use with a quadrature modulator or quadrature demodulator and which may provide real-time compensation.

BACKGROUND OF THE INVENTION

Quadrature modulators used in communication systems receive quadrature inputs $x_I$ and $x_Q$ which are modulated up to a carrier frequency $\omega_c$. The quadrature modulator operates by mixing the in-phase input signal, $x_I$, with $\cos(\omega_c t + \phi)$ and quadrature-phase input signal $x_Q$ by $\sin(\omega_c t - \phi)$ and summing together the two mixed signals. Generally the error, $\phi$, is regarded as a function of the carrier frequency $\omega_c$. But it has been determined that the error $\phi$ is also a function of the frequency of inputs $x_I$ and $x_Q$ and further that as the input signal bandwidth $x_I$, $x_Q$ becomes larger, there is more variation in the error $\phi$ across the band. Thus the conventional approach of assuming phase error $\phi$ is constant across the input signal frequency band and nulling out phase error $\phi$, by pre-compensating for a constant phase error is not truly sufficient. The gain imbalance (frequency dependent or otherwise) and local oscillator feed-through due to dc-offset in the I and Q paths are assumed to be taken care of by other means and are not addressed here. These gain and dc-offset terms are hence not shown or discussed in the rest of the disclosure.

BRIEF SUMMARY OF THE INVENTION

It is therefore an object of this invention to provide an improved quadrature imbalance compensation system and method that reduces quadrature imbalance error over a wide input signal bandwidth.

It is a further object of this invention to provide such an improved wideband quadrature imbalance compensation system and method which may provide fixed or real-time pre-compensation for quadrature imbalance error.

It is a further object of this invention to provide such an improved wideband quadrature imbalance compensation system and method which improves the error vector magnitude (EVM) of the transmit signal.

The invention results from the realization that quadrature imbalance error compensation over a wide input signal band width can be achieved by introducing inverse complex inputs to phase quadrature estimator filters to generate estimated quadrature modulator distortion; summing estimator quadrature modulator distortion with a delayed version of the actual complex input to obtain estimated quadrature modulator output; comparing the output with the true output to obtain residual quadrature imbalance error; applying a least mean square algorithm to the inverse input and imbalance residual error to obtain an updated estimate of filter coefficients; updating the filter coefficients of the phase quadrature estimator; and updating the filter coefficients of a phase quadrature compensator with the filter coefficients of the phase quadrature estimator to obtain a quadrature output pre-compensated for quadrature imbalance error.

The subject invention, however, in other embodiments, need not achieve all these objectives and the claims hereof should not be limited to structures or methods capable of achieving these objectives.

This invention features a wideband quadrature imbalance error compensation system including an in-phase channel for receiving an in-phase input and having a first in-phase filter circuit and a quadrature channel for receiving a quadrature input and having a first quadrature filter circuit. There is a first cross-coupled filter responsive to the quadrature input and a second cross-coupled filter responsive to the in-phase input. A first in-phase summing circuit is responsive to the first in-phase filter circuit and the first cross-coupled filter to provide a first complex signal and a first quadrature summing circuit is responsive to the first quadrature filter circuit and the second cross-coupled filter to provide a second complex signal. There is a complex circuit for rotating the second complex signal by 90° and a first output summing circuit responsive to the first complex signal and second rotated complex signal to provide a quadrature output pre-compensated for quadrature imbalance error.

In a preferred embodiment the in-phase and quadrature filters may include delay circuits. The cross-coupled filters may be complex coefficient filters. The cross-coupled filters may be FIR filters. There may be a phase quadrature estimator for determining the complex coefficients for the first and second cross-coupled filters for minimizing quadrature imbalance error. The phase quadrature estimator may further include an in-phase channel for receiving an in-phase input and having a second in-phase filter circuit; a quadrature channel for receiving a quadrature input and having a second quadrature filter circuit; a third cross-coupled filter responsive to the quadrature input; a fourth cross-coupled filter responsive to the in-phase input; a fourth in-phase summing circuit responsive to the second in-phase filter circuit and the third cross-coupled filter to provide a third complex signal; a fifth quadrature summing circuit responsive to the fourth quadrature filter circuit and the fourth cross-coupled filter to provide a fourth complex signal; a complex circuit for rotating the fourth complex signal by 90°; and a sixth output summing circuit responsive to the third complex signal and fourth rotated complex signal to provide a quadrature output pre-compensated for quadrature imbalance error. The phase quadrature estimator may include a comparator responsive to the true output of the quadrature modulator and the estimate of the quadrature modulator output for determining the residual quadrature imbalance error. The phase quadrature estimator may include a least mean square device responsive to the residual quadrature imbalance error and the inverse quadrature modulator input to modify the cross-coupled filter coefficients in the phase quadrature estimator to reduce residual quadrature imbalance error. The phase quadrature estimator may include a control circuit to update the filter coefficients of the first and second cross-coupled filter from the coefficients of the third and fourth cross-coupled filters.

This invention also feature a method for compensating for wideband quadrature modulator imbalance error including introducing inverse complex inputs to phase quadrature estimator filters to generate estimated quadrature distortion and summing estimator quadrature distortion with a delayed version of the actual complex input to obtain estimated quadrature output. The output is compared with the true output to obtain residual quadrature imbalance error and a least mean square operation is applied to the inverse input and imbalance residual error to obtain an updated estimate of filter coefficients. The filter coefficients of the phase quadrature estimator are updated as are the filter coefficients of a phase quadrature compensator with the filter coefficients of the phase quadrature estimator to obtain a quadrature output pre-compensated for quadrature imbalance error.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
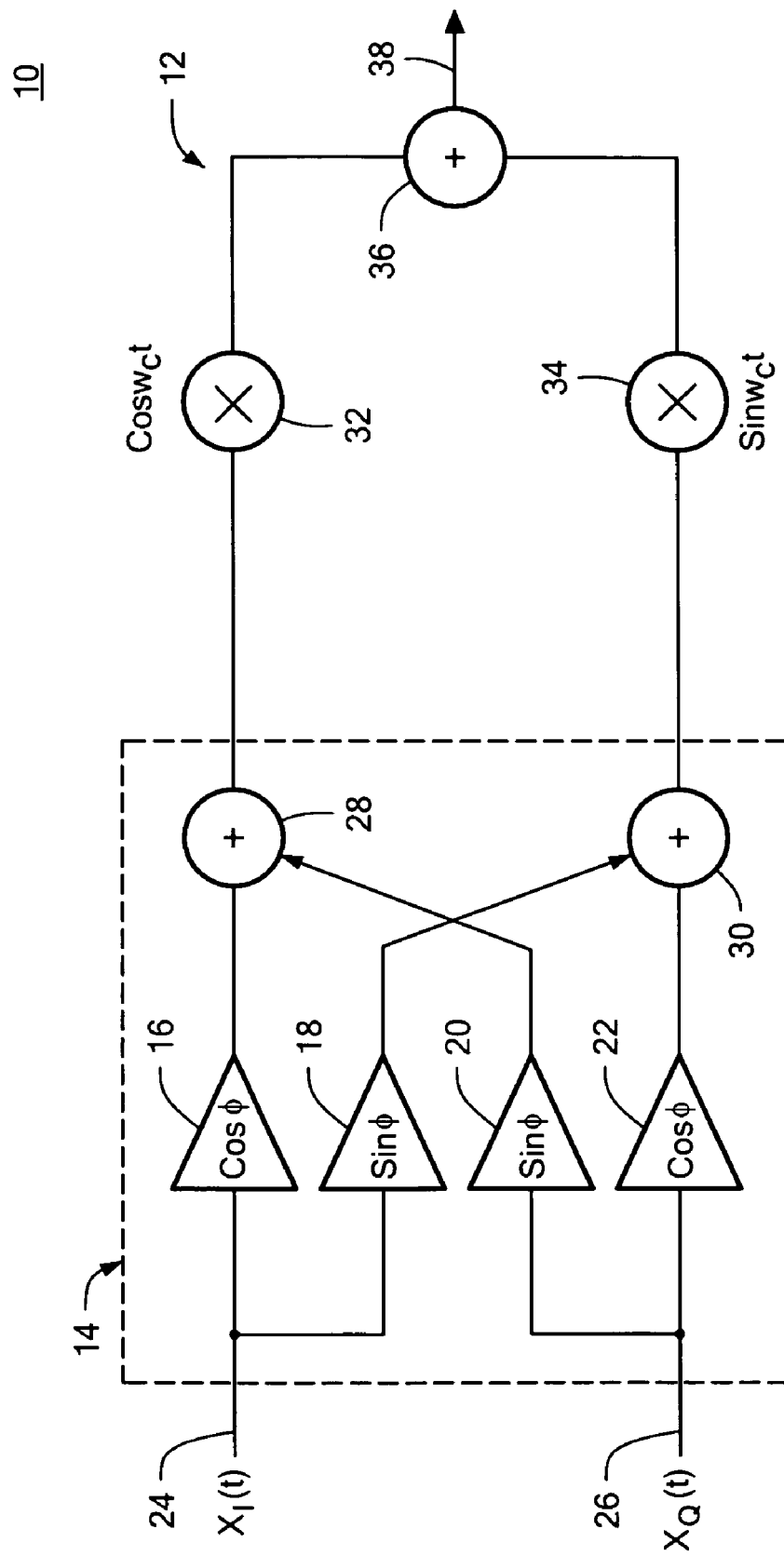
FIG. 1 is a schematic diagram of prior art circuit which models phase quadrature error employing a cross-coupled filter structure.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 a conventional model of a quadrature modulator 10 including an ideal modulator 12 and the equivalent circuit 14 representing the error. The model receives the inputs $x_1(t)$ and $x_Q(t)$. The equivalent circuit 14 formed by the cross-coupled filter structure uses four multipliers 16, 18, 20 and 22 to represent the actual error occurring in a real quadrature modulator. Multipliers 16 and 22 are connected directly in the in phase 24 and quadrature phase 26 channels to the summers 28 and 30, respectively. Multipliers 16 and 22 introduce the multiplier cosine φ. The other two multipliers 18 and 20 are cross-coupled as shown and introduce the multiplier sine φ. These signals are combined in mixers 32 and 34 with the carrier signal $\omega_c$ via cosine $\omega_c t$ and sine $\phi_c t$, all respectively. The two outputs are then combined in output summer 36 to provide a single real output at 38.

Figure 2:
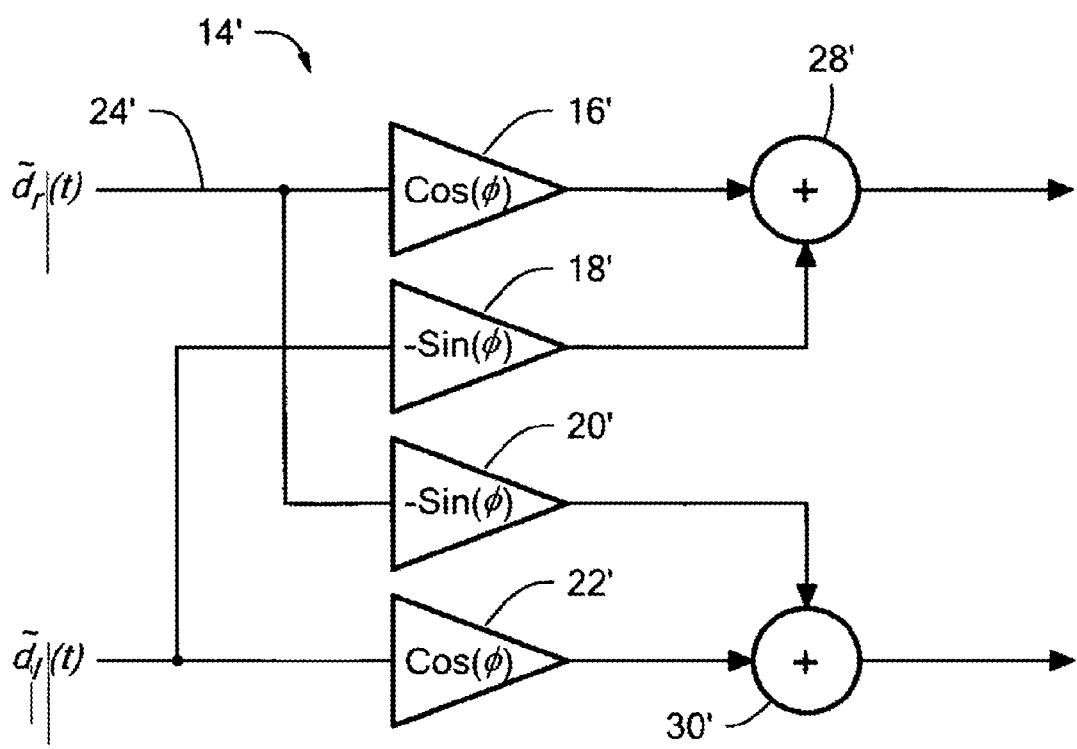
FIG. 2; is a schematic diagram of a prior art phase quadrature compensator formed from a cross-coupled filter structure derived from the model of FIG. 1.

In a conventional way the equivalent circuit 14, FIG. 2, which represents the error occurring in a typical quadrature modulator, is used to generate a similar looking degenerate cross-coupled filter structure 40 employing the same configuration as equivalent circuit 14 but inverted. Thus, while multiplier 16' and 22' provide the multiplier cosine φ, multipliers 18' and 20' provide not the multiplier sine φ but rather the multiplier—sine φ.

In accordance with this invention equivalent error circuit 14a where like parts have been given like number and similar parts like numbers accompanied by a lower case letter. Equivalent error circuit 14a formed by the cross-coupled filter structure may include four filters 16a, 18a, 20a, and 22a. Filters 18a and 20a may typically be complex coefficient filters, such as FIR filters. Filter circuit 16a and 22a may be simply delay circuits which introduce the same delay as filters 18a and 20a. In-phase channel 24a receives input $x_1(n)$ and quadrature-phase channel 26a receives $x_Q(n)$. The output of each channel is a complex number $y_1(n)$ and $y_2(n)$, respectively. The complex number $y_2(n)$ is rotated by 90 degrees (i.e. multiplied by j) by phase circuit 42. The two complex numbers $y_1(n)$ and $y_2(n)$ are combined in summer 44 and to provide the output, a complex number, $y(n)=y_1(n)+j \cdot y_Q(n)$ where $y_1$ is the real portion of the complex number and $y_Q$ is the imaginary portion of the complex number. The cross-coupled filter structure, FIG. 3, functioning as the equivalent error circuit 14a may be employed as the phase quadrature compensation circuit 50, FIG. 4, by once again inverting the signal by changing the signs of the coefficients h in the cross-coupled filters 18a' and 20a'.

Figure 3:
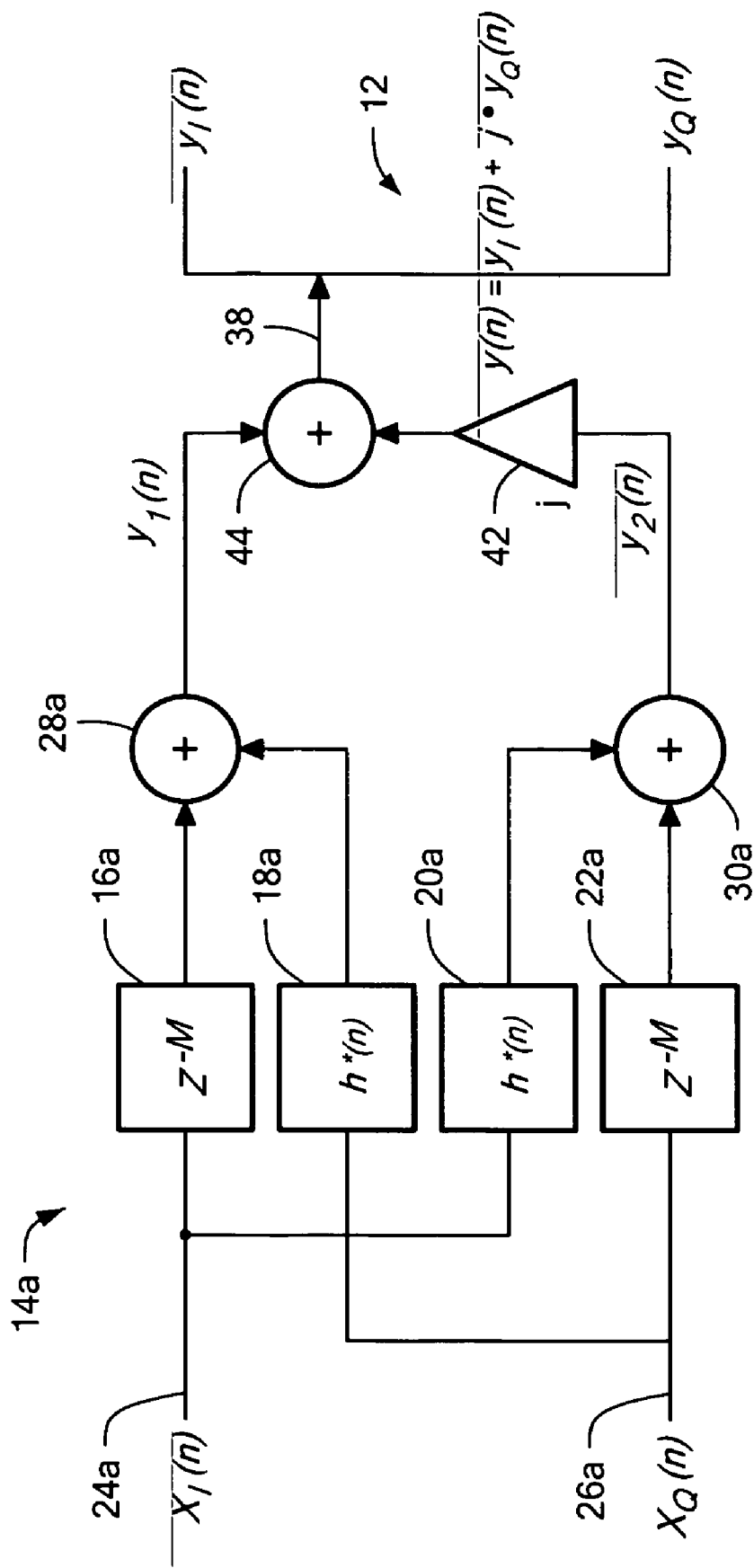
FIG. 3 is a schematic diagram of a circuit model of a quadrature modulator/de-modulator according to this invention.
Figure 4:
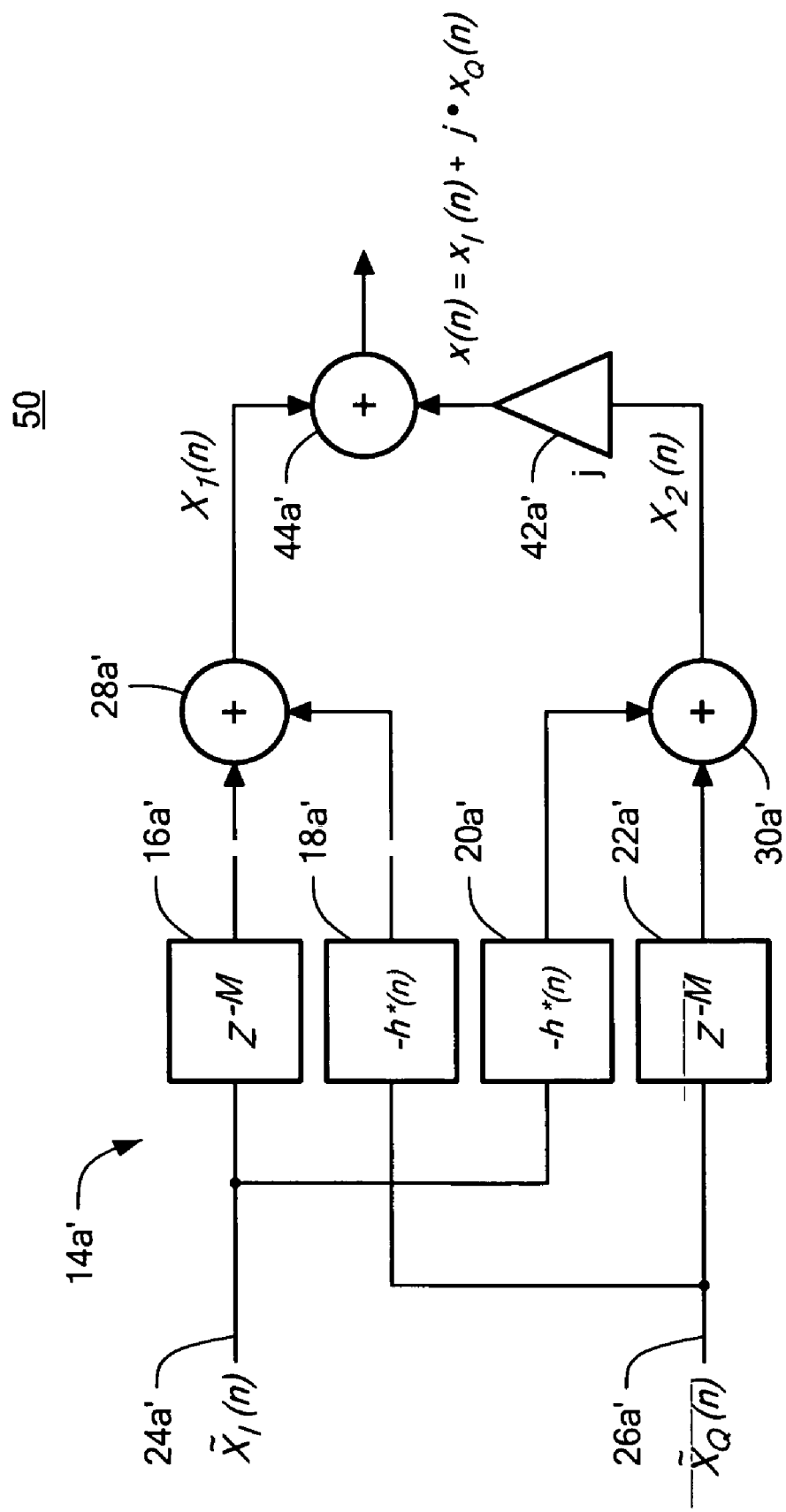
FIG. 4 is a schematic diagram of a phase quadrature compensator formed from the cross-coupled filter structure devised for the model of FIG. 3 according to this invention.

That is, the cross-coupled filter structure 14a of FIG. 3 can be employed as a phase quadrature compensator by simply inverting the operation of cross-coupled filter structure 14a' by putting a minus sign to each of the cross-coupled filters 18a' and 20a'. Thus, the cross-coupled filter structure 14a' of FIG. 4 becomes a phase quadrature compensator 50, FIG. 4, according to this invention. Although the description herein is with reference to modulators the invention is also applicable to demodulators.

Figure 5:
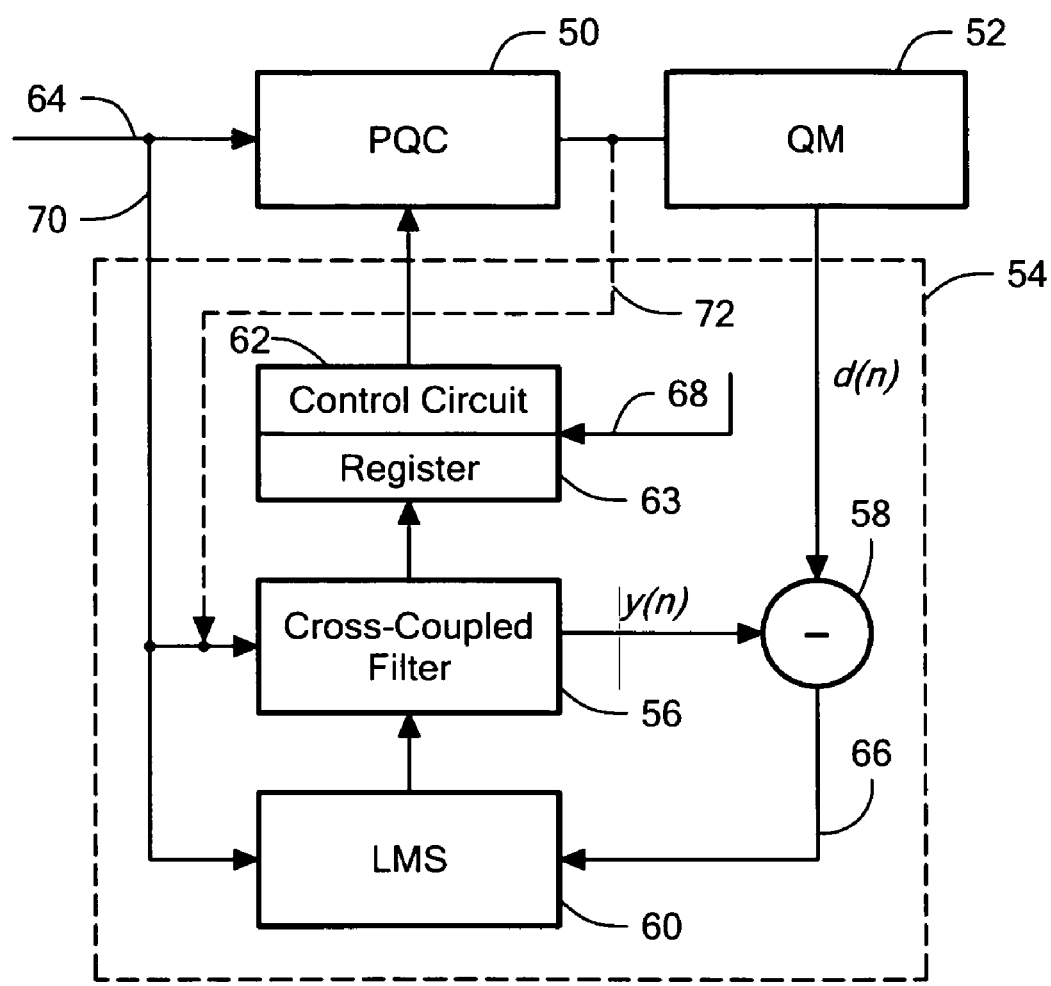
FIG. 5 is a schematic diagram of a wideband quadrature imbalance error compensation system according to this invention.

In one embodiment in a wideband quadrature modulator imbalance error compensation system 49 the cross-coupled filter structure functioning now as phase quadrature compensator 50, FIG. 5, may be used to pre-compensate for the quadrature imbalance errors in quadrature modulator 52. Phase quadrature compensator 50 is driven to provide the proper pre-compensation to quadrature modulator 52 by phase quadrature estimator 54 which also uses a cross-coupled filter 56 similar to that implementing phase quadrature compensator 50. The pre-compensation may be a complex output which is an estimate of the output of the quadrature modulator. Also included in phase quadrature estimator 54 are comparing circuit 58, least mean square circuit 60 and a control circuit 62 including a register 63.

In operation the true output d(n) of quadrature modulator 52 is delivered to comparator 58 as is the output y(n) of cross-coupled filter 56. Cross-coupled filter responds to the same input on line 64 as phase quadrature compensator 50. Any difference between the estimated quadrature modulator output y(n) and the true output d(n) results in a residual error on line 66. The least mean square algorithm 60 is applied to the residual error on 66 to minimize that error by adjusting the value of the coefficients h in filters 18a and 20a in FIG. 3. These values for h are stored in register 63, FIG. 5, and control circuit 62 upon a signal, for example on line 68, shifts those h values from cross-coupled filter 56 in phase quadrature estimator 54 to the similar cross-coupled filters in phase quadrature compensator 50. This continues until the error is minimized. This can be a real time system or simply a one time set-up operation. The h values in register 63 may be added to the h values in phase quadrature compensator 50 if the input to cross-coupled filter 56 is received on line 70 which corresponds to the input to phase quadrature compensator 50. If instead cross-coupled filter 56 receives its input on line 72 corresponding to the output from phase quadrature compensator 50, then the h values in register 63 from cross-coupled filter 56 in phase quadrature estimator 54 are copied to the h value coefficients in phase quadrature compensator 50.

Figure 6:
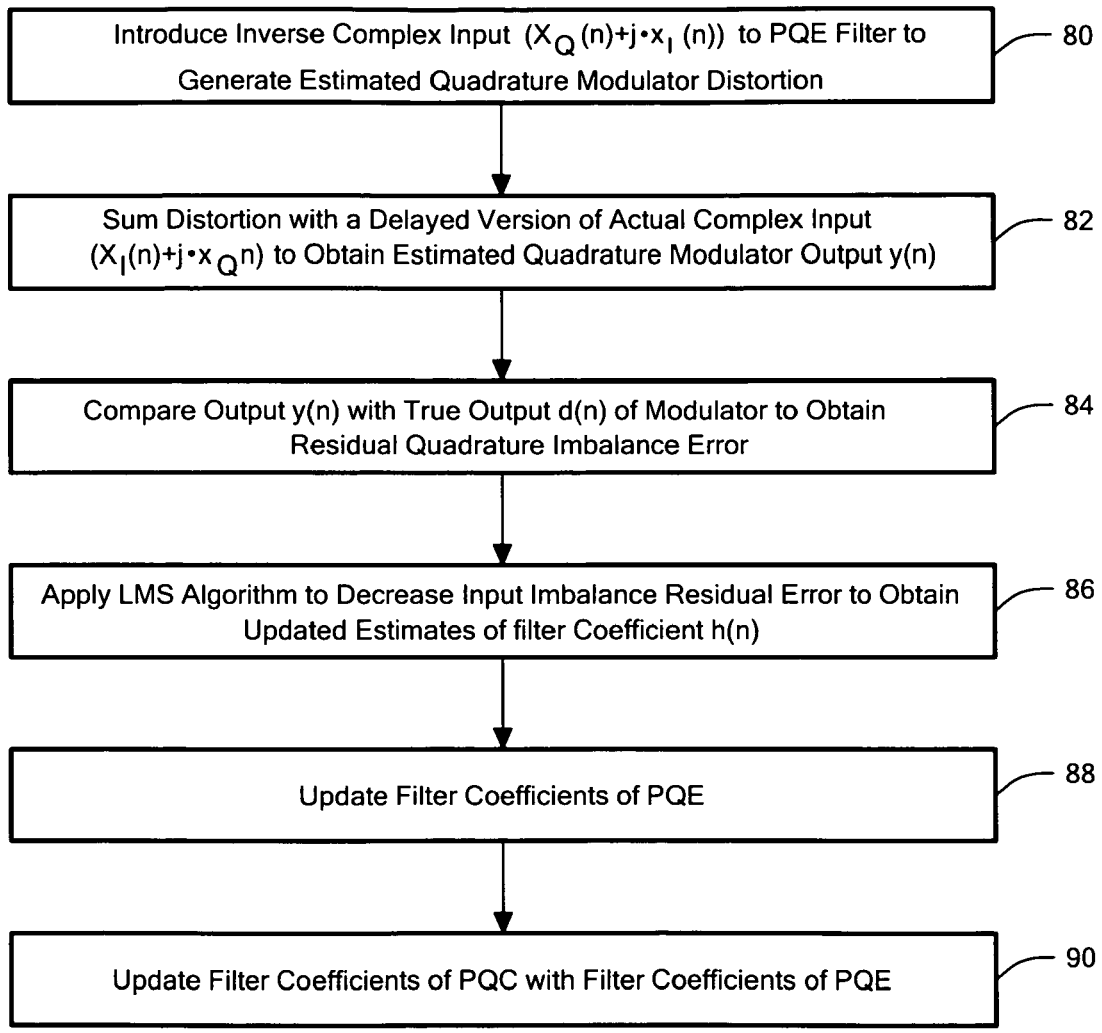
FIG. 6 is a flow chart of the wideband quadrature compensation method according to this invention.

The method according to this invention as shown in FIG. 6 begins with the introduction of the inverse complex input $(x_Q(n)+j \cdot x_1(n))$ to phase quadrature estimator filters to generate estimated quadrature modulator distortion 80. The distortion is summed 82, with a delayed version of the actual complex input $(x_1(n)+j \cdot x_Q n)$ to obtain estimated quadrature modulator output y(n). The output y(n) is then compared 84 with the true output d(n) of the modulator to obtain residual quadrature imbalance error. A least mean square (LMS) algorithm is applied 86 to the inverse input and the imbalance residual error to obtain an updated estimate of the filter coefficients h (n). The filter coefficients of the phase quadrature estimator are then updated 88, and those values are used to update 90 the filter coefficients of the phase quadrature compensator with the filter coefficients of the phase quadrature estimator.

Figure 7:
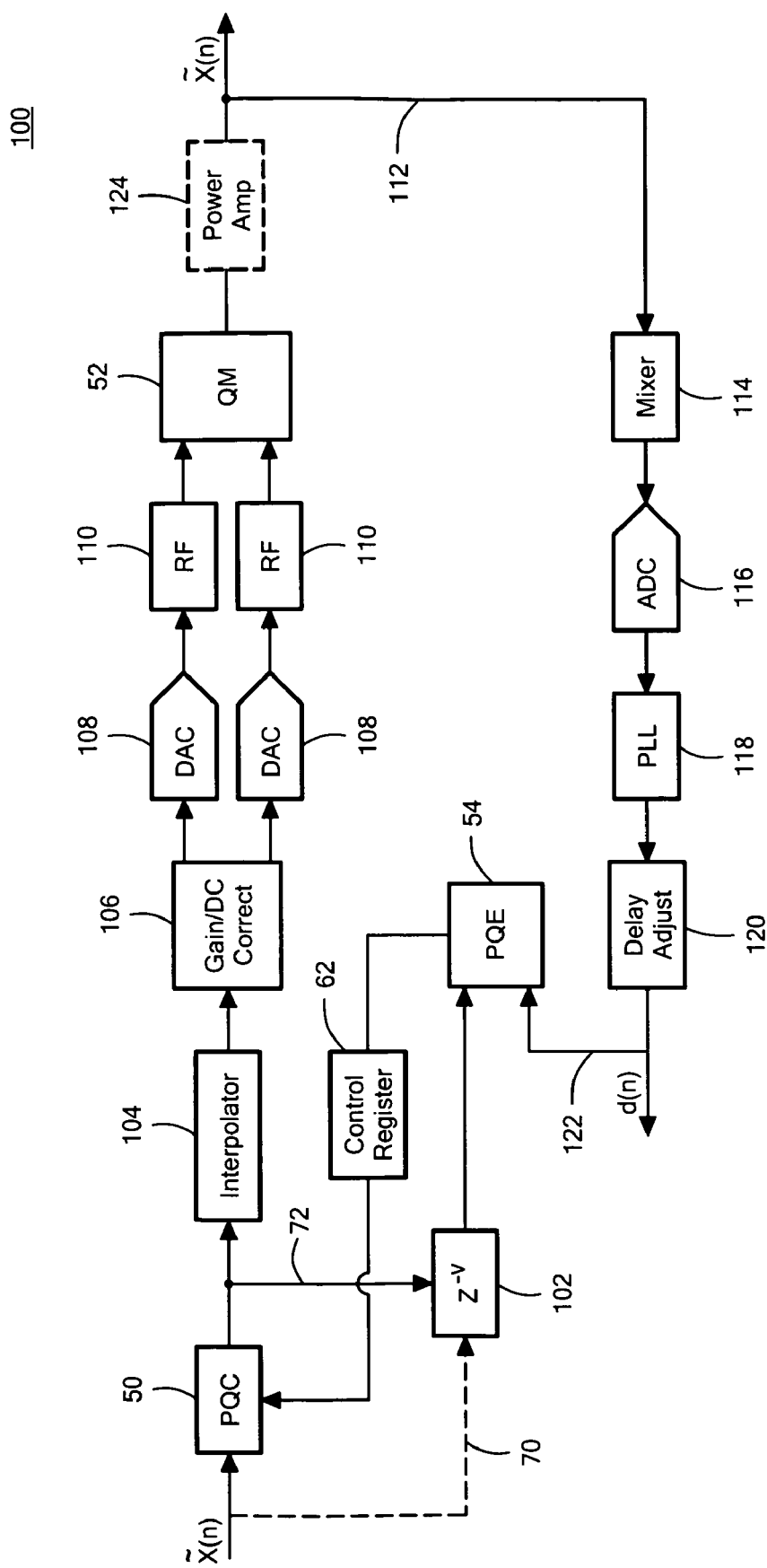
FIG. 7 is a block diagram of a modulator application of the phase quadrature estimator and phase quadrature compensator according to this invention.

The phase quadrature compensator 50, may be applied in a modulator circuit by placing it in the transmit path upstream of the quadrature modulator 52 to correct for the frequency dependent quadrature imbalance of the quadrature modulator 100 as shown in FIG. 7. The digital input x̃(n) is provided to phase quadrature compensator 50 and, also along line 70 for example, to delay circuit 102. The pre-compensated signal x(n) from phase quadrature compensator 50 is delivered to interpolator 104 which operates in the conventional manner to increase the number of sample points. The gain and dc offset are then corrected in circuit 106 and the output is delivered to DACs 108 which in turn deliver the signal to reconstruction filters 110 and thereafter to quadrature modulator 52 whose output is an analog version x̃(n) of the digital input. The output is delivered on line 112 to down mixer 114, then to analog to digital converter 116 and phase lock loop 118. The output from phase lock loop 118 after a suitable delay in delay adjust circuit 120 is delivered to phase quadrature estimator 54. Delay circuit 102 time aligns the input from line 70 or 72 to phase quadrature estimator 54 to adjust for the time delay through the entire loop of interpolator 104, gain/dc correct circuit 106, DACs 108, reconstruction filters 110, quadrature modulator 52, mixer 114, ADC 116, phase lock loop 118, and delay adjust 120. Delay adjust 120 adjusts for any delay between the true input d(n) on line 122 and the output y(n) from cross-coupled filter 56 in phase quadrature estimator 54. Some of the blocks mentioned above may be connected in a different order, some may not be present while others not mentioned may be present in the chain. For example, in FIG. 8, phase quadrature compensator (PQC) 50, is placed in the observation path, downstream of the quadrature demodulator (QDM) 52' to correct for frequency imbalance of QDM 52'.

Typically a power amplifier 124 is used to drive the output. When this is the case the non-linearity of the power amplifier 124 can interfere with the operation of the compensation system 49 including phase quadrature compensator 50 and phase quadrature estimator 54 producing misleading coefficients for the cross-coupled filters. To avoid this problem, an approach of using a series of single tones one at a time to obtain corresponding values of coefficients h followed by a resolution of all of those single tones to obtain a full characteristic can be used as follows.

Figure 9:
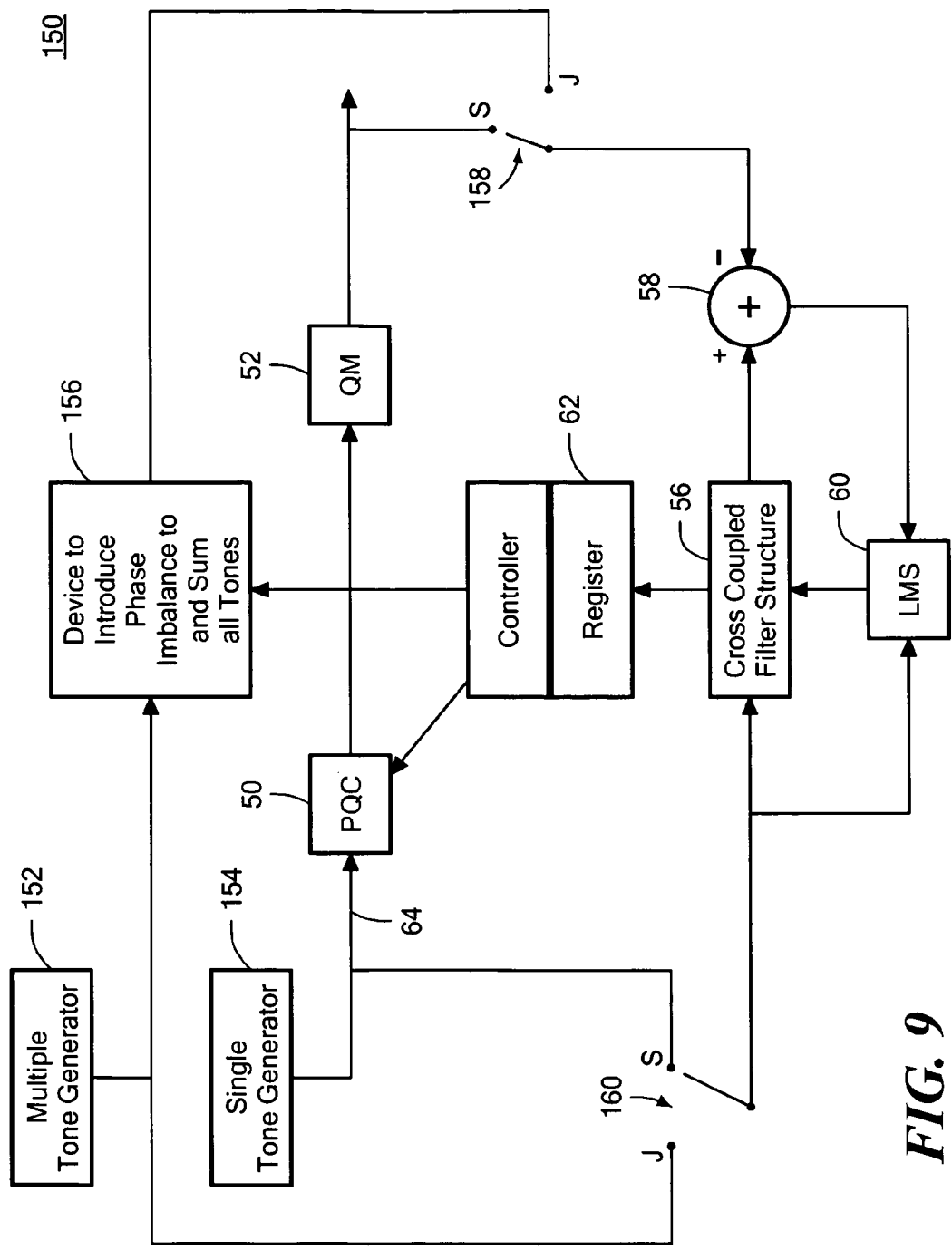
FIG. 9 is a block diagram of an approach to train the coefficients of a wide-band phase quadrature imbalance error compensation system according to this invention.

There is shown in FIG. 9, a block diagram of an approach to train the coefficients of a wide-band phase quadrature imbalance error compensation system 150 according to this invention. It includes multiple tone generator 152 and single tone generator 154. There is a device 156 to introduce phase imbalance to and sum all tones which responds to multiple tone generator 152 and delivers an output to switch 158. Single tone generator 154 also provides an output to switch 158 through phase quadrature compensator 50 and quadrature modulator 52. Controller register 62 provides inputs to device 156 and phase quadrature compensator 50 and receives an input from cross-coupled filter structure 56. Switch 160 applies the output of either multiple tone generator 152 or single tone generator 154 to cross-coupled filter structure 56 and least mean square circuit 60.

Figure 10:
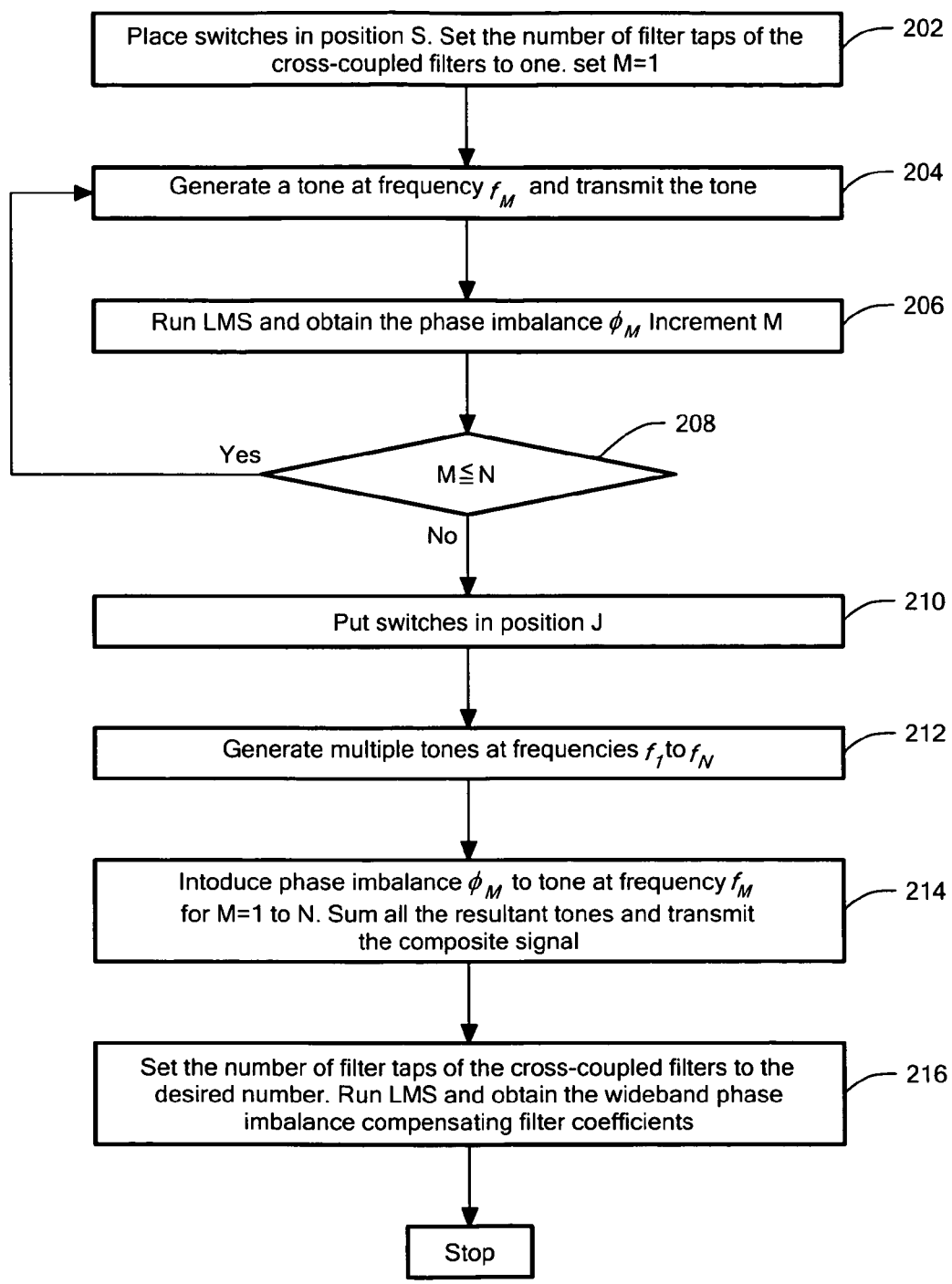
FIG. 10 is a flow chart describing an approach to train the filters in the wideband quadrature compensation method according to this invention.

The operation occurs as depicted by flow chart 200, FIG. 10. In step 202 the switches 158, 160 are set to S and the number of filter taps of cross-coupled filter structure is set to one. A single tone from single tone generator 154 is generated in step 204 and the least mean square circuit 60 operates to obtain the phase imbalance in step 206. A number of tones N are to be processed. If the present tone M is less than N in step 208 the routine loops back to step 204. Otherwise in step 210 the switches 158, 160 are placed in position J. In step 212, multiple tones are generated. Now, in step 214, the phase imbalance is introduced to a tone for M=1 to N, the resultant tones are summed and the composite signal is transmitted. The number of filter taps of the cross-coupled filter structure 56 is set, step 216, and the least mean square operation is run to obtain the wideband phase imbalance compensating filter coefficients.

Figure 8:
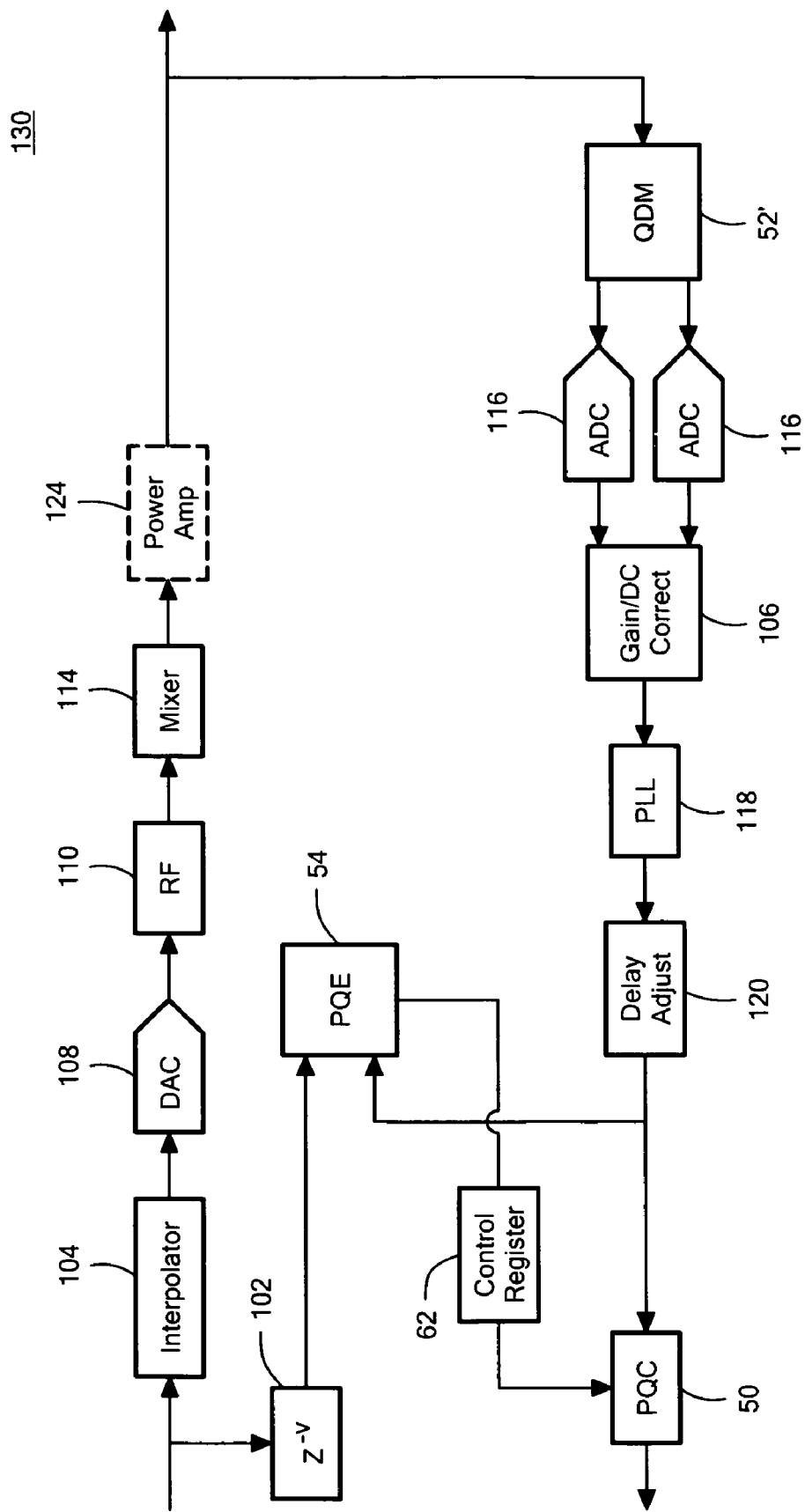
FIG. 8 is a block diagram of a demodulator application of the phase quadrature estimator and phase quadrature compensator according to this invention.

The wideband quadrature modulator imbalance error compensation system and method may also be applied to a demodulator 130, FIG. 8, wherein the quadrature demodulator 52' requires the same approach to obtaining the proper values of the filter coefficients h. The system and method can be applied both real time so that the filter coefficients are constantly updated with changing temperature and other affects or may be applied as a one time operation or a table of values for the coefficients may be stored, for example, in a look up table and applied as conditions change.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A wideband quadrature imbalance error compensation system, comprising:
   an in-phase channel for receiving an in-phase input, the in-phase channel having a first in-phase filter circuit;
   a quadrature channel for receiving a quadrature input, the quadrature channel having a first quadrature filter circuit;
   a first cross-coupled filter responsive to the quadrature input;
   a second cross-coupled filter responsive to the in-phase input;
   a first in-phase summing circuit responsive to the first in-phase filter circuit and the first cross-coupled filter to provide a first complex signal;
   a first quadrature summing circuit responsive to the first quadrature filter circuit and the second cross-coupled filter to provide a second complex signal;
   a complex circuit for rotating the second complex signal by 90°;
   a first output summing circuit responsive to the first complex signal and second rotated complex signal to provide a quadrature output pre-compensated for a quadrature imbalance error in an output of a quadrature modulator; and
   a phase quadrature estimator for determining the coefficients of the first and second cross-coupled filters to minimize the quadrature imbalance error;
   wherein the phase quadrature estimator includes:
   a comparator responsive to the output of the quadrature modulator and an estimate of the output of the quadrature modulator to determine a residual quadrature imbalance error; and
   a least mean square estimator responsive to the residual quadrature imbalance error and an input of the wideband quadrature imbalance error compensation system to update the coefficients of the first and second cross-coupled filters.

2. The wideband quadrature imbalance error compensation system of claim 1, wherein the cross-coupled filters are complex coefficient filters.

3. The wideband quadrature imbalance error compensation system of claim 2 further including a phase quadrature estimator for determining the complex coefficients for the first and second cross-coupled filters for minimizing quadrature imbalance error.

4. A wideband quadrature imbalance error compensation system, comprising:
   an in-phase channel for receiving an in-phase input, the in-phase channel having a first in-phase filter circuit;
   a quadrature channel for receiving a quadrature input, the quadrature channel having a first quadrature filter circuit;
   a first cross-coupled filter responsive to the quadrature input;
   a second cross-coupled filter responsive to the in-phase input;
   a first in-phase summing circuit responsive to said first in-phase filter circuit and the first cross-coupled filter to provide a first complex signal;
   a first quadrature summing circuit responsive to the first quadrature filter circuit and the second cross-coupled filter to provide a second complex signal;
   a complex circuit for rotating the second complex signal by 90°;
   a first output summing circuit responsive to the first complex signal and second rotated complex signal to provide a quadrature output pre-compensated for a quadrature imbalance error in an output of a quadrature modulator;
   a phase quadrature estimator for determining the complex coefficients for the first and second cross-coupled filters for minimizing the quadrature imbalance error;
   wherein the first and second cross-coupled filters are complex coefficient filters;
   wherein the phase quadrature estimator further includes:
   an in-phase channel for receiving the in-phase input, the in-phase channel of the phase quadrature estimator having a second in-phase filter circuit;
   a quadrature channel for receiving the quadrature input, the quadrature channel of the phase quadrature estimator having a second quadrature filter circuit;
   a third cross-coupled filter responsive to the quadrature input;
   a fourth cross-coupled filter responsive to the in-phase input;
   a second in-phase summing circuit responsive to the second in-phase filter circuit and the third cross-coupled filter to provide a third complex signal;
   a second quadrature summing circuit unit responsive to the second quadrature filter circuit and the fourth cross-coupled filter to provide a fourth complex signal;
   a second complex circuit for rotating the fourth complex signal by 90°; and
   a second output summing circuit responsive to the third complex signal and fourth rotated complex signal to provide a complex output which is an estimate of the output of the quadrature modulator.

5. The wideband quadrature imbalance error compensation system of claim 4, wherein the in-phase and quadrature channels include delay circuits.

6. The wideband quadrature imbalance error compensation system of claim 4, wherein the cross-coupled filters are FIR filters.

7. The wideband quadrature imbalance error compensation system of claim 4 in which the phase quadrature estimator includes a comparator responsive to the output of the quadrature modulator and the estimate of the output of the quadrature modulator for determining a residual quadrature imbalance error.

8. The wideband quadrature imbalance error compensation system of claim 7 in which the phase quadrature estimator includes a least mean square device responsive to the residual quadrature imbalance error and an input of the wideband quadrature imbalance error compensation system to modify the third and fourth cross-coupled filter coefficients in the phase quadrature estimator to reduce the residual quadrature imbalance error.

9. The wideband quadrature imbalance error compensation system of claim 8 in which the phase quadrature estimator includes a control circuit to update the filter coefficients of the first and second cross-coupled filters based on modifications to the coefficients of the third and fourth cross-coupled filters.

10. A method for compensating for wideband quadrature modulator imbalance error, comprising:
    introducing inverse complex inputs to phase quadrature estimator filters to generate an estimated quadrature distortion;
    summing the estimated quadrature distortion with a delayed version of the actual complex input to obtain an estimated quadrature modulator output;

comparing the estimated quadrature modulator output with an output of a quadrature modulator to obtain a residual quadrature imbalance error;

applying a least mean square algorithm to the inverse complex inputs and the residual quadrature imbalance error to obtain an updated estimate of filter coefficients;

updating the filter coefficients of the phase quadrature estimator filters; and updating the filter coefficients of a phase quadrature compensator with the filter coefficients of the phase quadrature estimator filters to obtain a quadrature output pre-compensated for the quadrature modulator imbalance error.

11. A quadrature imbalance error compensation system, comprising:

a quadrature modulator having (1) an input terminal and (2) an output terminal;

a phase quadrature compensator having (1) an input terminal for receiving an input signal and (2) an output terminal that is coupled to the input terminal of the quadrature modulator, wherein the phase quadrature compensator includes a pair of cross-coupled filters; and a phase quadrature estimator having (1) an input terminal that is coupled to the input terminal of the phase quadrature compensator and (2) an output terminal for outputting updates to coefficients of the pair of cross-coupled filters of the phase quadrature compensator, wherein the phase quadrature estimator includes:

a pair of cross-coupled filters having (1) an input terminal that is coupled to the input terminal of the phase quadrature estimator for receiving the input signal and (2) an output terminal for outputting an estimate of the output of the quadrature modulator;

a comparator responsive to the output of the quadrature modulator and the estimate of the output of the quadrature modulator to compute a residual quadrature imbalance error; and a least mean square estimator responsive to the residual quadrature imbalance error and the input signal to modify the coefficients of the pair of cross-coupled filters of the phase quadrature estimator and output the updates at the output terminal of the quadrature estimator.

12. The quadrature imbalance error compensation system of claim 11, wherein the phase quadrature compensator further includes:

an in-phase channel for receiving an in-phase of the input signal, the in-phase channel having a first in-phase filter circuit;

a quadrature channel for receiving a quadrature phase of the input signal, the quadrature channel having a first quadrature filter circuit;

a first cross-coupled filter responsive to the quadrature phase;

a second cross-coupled filter responsive to the in-phase;

a first in-phase summing circuit responsive to the first in-phase filter circuit and the first cross-coupled filter to provide a first complex signal;

a first quadrature summing circuit responsive to the first quadrature filter circuit and the second cross-coupled filter to provide a second complex signal;

a complex circuit for rotating the second complex signal by 90°; and a first output summing circuit responsive to the first complex signal and the rotated second complex signal to provide a quadrature output pre-compensated for the quadrature imbalance error.

* * * * *